Sept. 15, 1953   B. B. WEAVER   2,651,982
FILM DEVELOPING TABLE
Filed March 23, 1951   2 Sheets-Sheet 2
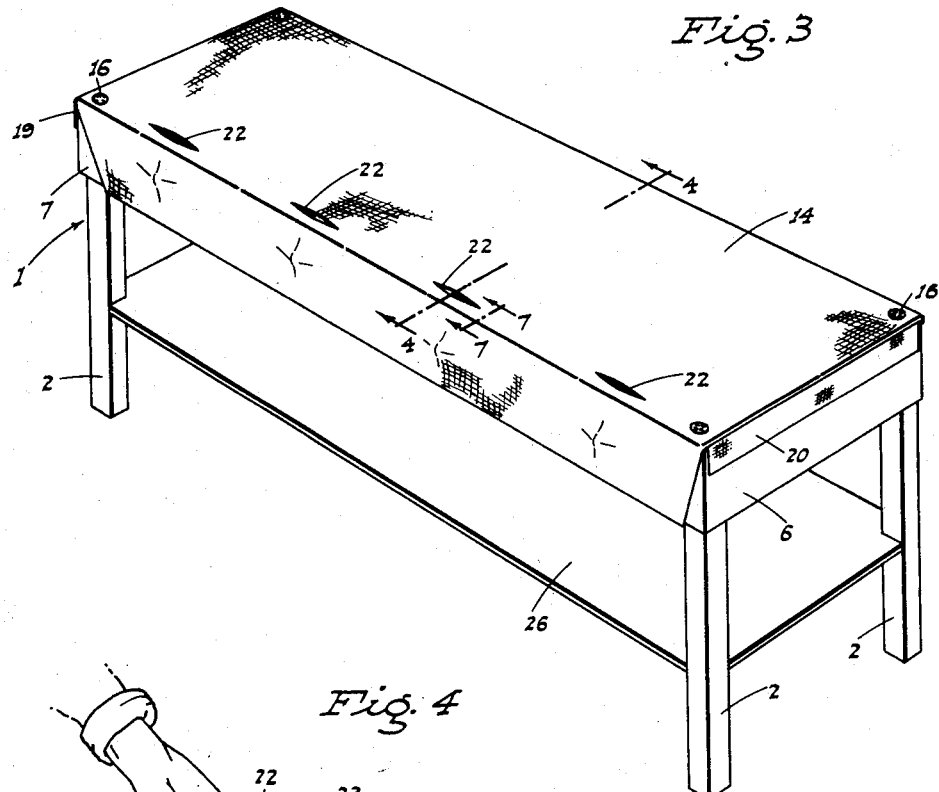
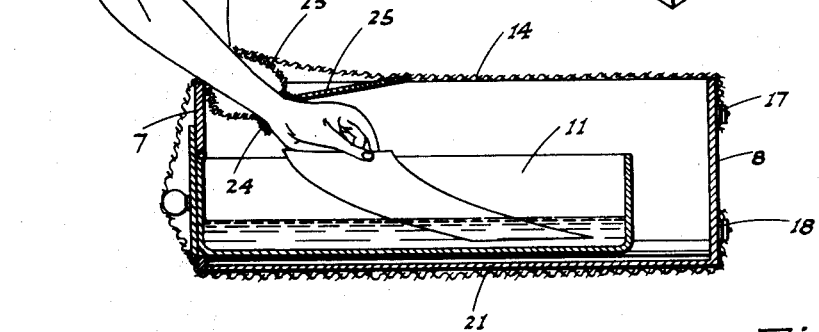
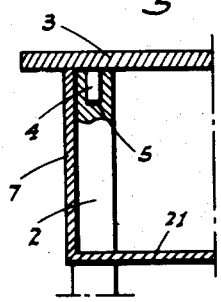
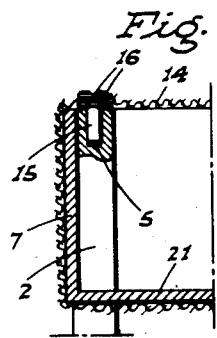
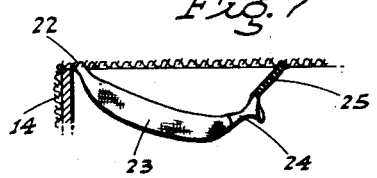
INVENTOR
Beatrice B. Weaver Patented Sept. 15, 1953

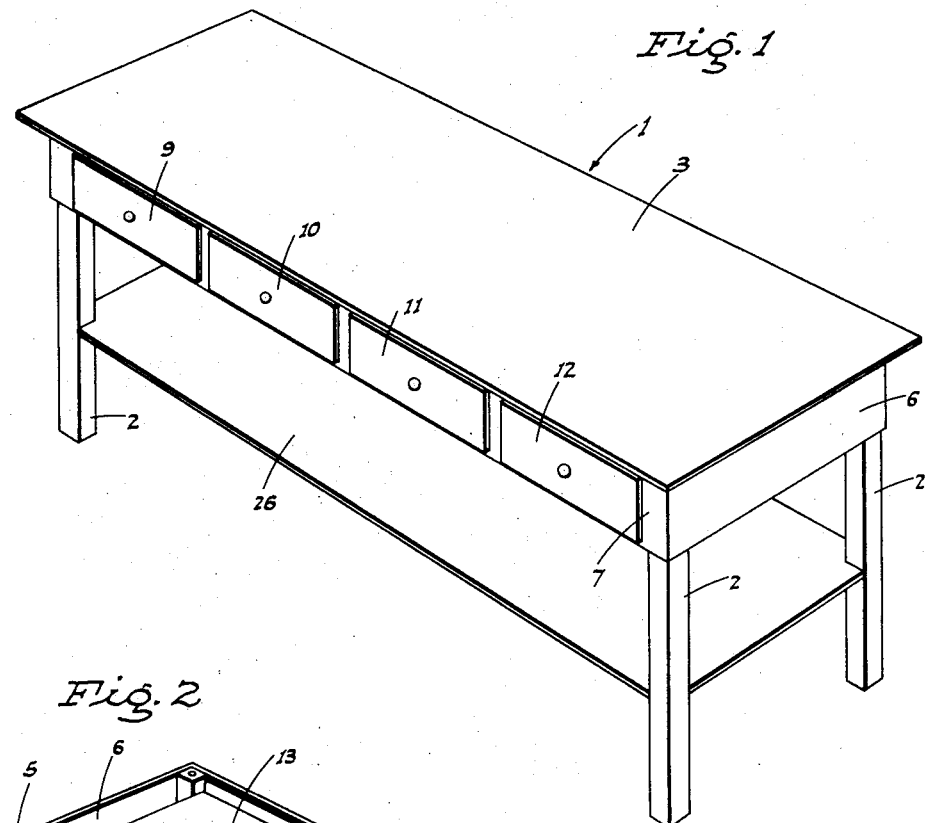
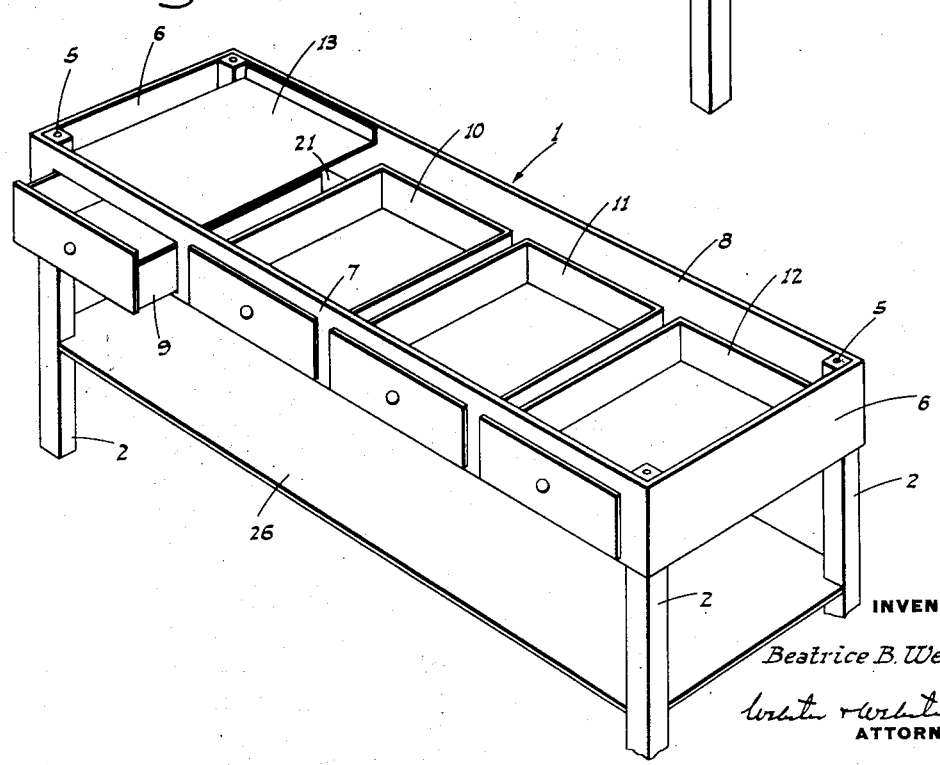

2,651,982

UNITED STATES PATENT OFFICE 2,651,982

FILM DEVELOPING TABLE

Beatrice Bonita Weaver, Yuba City, Calif.

Application March 23, 1951, Serial No. 217,107

4 Claims. (Cl. 95—91)

1

This invention relates generally to a table intended primarily, but is not limited, for use in a hospital, particularly in the surgical section where emergency operations may be performed.

A major object of the present invention is to provide a table of general adaptation but which may be quickly converted for use to develop X-ray film in the surgical section of a hospital; the advantage being that X-ray film may be developed—for a doctor's use—in a short time and without the necessity of transferring the film to a regular dark room.

Another important object of the invention is to provide a table, as aforesaid, which—when converted for use to develop X-ray film—does not require the room to be darkened, and hence the table can be used in the operating room.

An additional object of the invention is to provide an X-ray film developing table, as in the preceding paragraphs, which when in use has a flexible, opaque cover secured in stretched relation on and forming the top of the table; there being light tight access sleeves opening through such cover whereby an operator may place the arms through such sleeves to reach film processing tanks which are disposed in a compartment beneath the cover.

A further object of the invention is to provide an X-ray film developing table wherein such film processing tanks are in the form of drawers, removable from the table for the purpose of cleaning such tanks.

It is also an object of the invention to provide an X-ray film developing table which is designed for ease and economy of manufacture, and ready, convenient use.

Still another object of the invention is to provide a practical and reliable film developing table, and one which will be exceedingly effective for the purpose for which it is designed.

These objects are accomplished by means of such structure and relative arrangement of parts as will fully appear by a perusal of the following specification and claims.

In the drawings:

Fig. 1 is a perspective view of the table as arranged with the removable, solid top for general use.

Fig. 2 is a similar view with such top removed, showing the tank forming drawer arrangement therebeneath.

Fig. 3 is a perspective view of the table with the solid top removed and the opaque cover substituted therefor.

Fig. 4 is an enlarged transverse section on line

2

4—4 of Fig. 3, showing the manner of use of each tank forming drawer.

Fig. 5 is an enlarged fragmentary sectional elevation showing the manner of securing the solid top to the table.

Fig. 6 is a similar view, but shows the manner of securing the corners of the opaque cover to the table.

Fig. 7 is a fragmentary transverse section on line 7—7 of Fig. 3.

Referring now more particularly to the characters of reference on the drawings, the table is indicated generally at 1, being rectangular but elongated in plan, and supported by corner legs 2. If desired, the corner legs 2 may be fitted, at the lower end, with casters for ease of movement of the table from place to place as working conditions may require.

The table 1 is normally fitted with a solid but removable top 3 held in place by downwardly projecting dowels or locator pins 4 which seat in sockets 5 in the upper ends of the legs 2; said legs terminating at their upper ends flush with or in the horizontal plane of the upper edges of the sides 6, front 7, and rear 8 of the table and which depend as a rigid skirt or framework below, but separate from, the table top to form a rectangular compartment which is open on top when the top 3 is removed.

The table is fitted with a row of drawers 9, 10, 11, and 12, which drawers, except drawer 9, are formed of a non-corrosive metal, being rectangular in plan, of substantial depth, and forming film processing tanks. The drawer 9 is for storage purposes, and a shelf 13 is mounted in the table below its upper edge but above said drawer 9; said shelf being of limited extent lengthwise of the table so that it does not cover any portion of the next drawer 10.

For use of the table, for developing X-ray film, the table top 3 is removed and is replaced by an initially flexible opaque cover 14, preferably of non-light reflecting color, such as black. The cover 14 is stretched taut on the table and secured by dowels or locator pins 15 which engage in the sockets 5; such pins being permanently fixed to the cover 14 at appropriate points by clamps 16.

Along its upper rear edge the cover 14 is detachably secured to the rear 8 of the table by snaps 17. From the rear 8 the cover extends to the front 7, passes down the same in front of the drawers, thence turns and runs beneath the table for its full width, and thence up the rear, being detachably secured to the latter by snaps 18.

In the foregoing manner the cover 14 is secured to the table, completely covering the internal portion of such table wherein the drawers 9–12 inclusive, and the shelf 13, are disposed. The cover 14 is formed, at opposite ends, with flaps 19 and 20 which depend down corresponding sides 6 of the table. With this arrangement, together with a bottom 21 which extends full length of the table between the front 7 and rear 8, the drawers 9–12 inclusive, together with the shelf 14, are in a compartment which is light-tight.

In alinement with each of the drawers 9–12 inclusive, the cover 14 is formed with a longitudinal slit 22 adjacent the front 7, and each such slit is in communication—under the cover 14—with a sleeve 23, likewise of flexible opaque material. At its inner end each sleeve 23 is formed with an elastic or knit cuff 24, and each sleeve is maintained above the corresponding drawer by an elastic suspension cord 25 connected between the cuff 24 and an inwardly disposed point on the under side of the cover 14.

When the table is arranged for the development of X-ray film, with the cover 14 in place, the X-ray film holder with the exposed film therein rests on the shelf 13; the tank formed by drawer 10 having film developing solution therein; the tank formed by drawer 11 having the film fixing or hypo solution therein; and the tank formed by the drawer 12 having the film washing water therein.

The operator, with the arms projecting through corresponding sleeves 23 in the manner shown in Fig. 4, first removes the film from the holder on shelf 13 and then develops such film in the solution in the tank formed by drawer 10; the timing being by mental counting or by an actual timing clock which may be disposed in a suitable location.

From the tank formed by the drawer 10, the developed X-ray film is worked successively through the tanks formed by the drawers 11 and 12, with appropriate timing at each step; the film being fixed in the tank formed by drawer 11 and washed in the tank formed by drawer 12.

After the film is thus processed, it is slipped out from beneath the cover 14 by raising the loose end flap 20 and passing the film between such flap and the adjacent upper edge of the corresponding side 6 of the table.

By reason of the particular form and arrangement of the sleeves 23, the operator can have the hands under the cover 14 for free movement, as is necessary in handling the film, but light entry through such sleeves into the table is prevented, especially by reason of the elastic or knit cuffs 24 which fit tightly about the operator's wrists.

Intermediate their upper and lower ends the corner legs 2 support a lower shelf 26 for general utility purposes, and the drawer 9 below the shelf 13 similarly serves for storage of material, including the cover 14 when it is folded and not in use on the table.

With the described invention, X-ray film can be developed rapidly; effectively; adjacent the point of need by the doctor—as in the surgery section of a hospital; and without the necessity of transporting the exposed film, with attendant loss of time, to a conventional dark room.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A film developing table comprising an elongated light-tight compartment, the latter including a flexible but relatively taut, opaque cover, means removably securing the cover on the table over the compartment, a row of tanks in the compartment, a plurality of openings in the cover for hand and arm entry into the compartment, sleeves on the cover within the compartment in communication with said openings and extending transversely of the compartments, elastic cuffs on the sleeve, and elastic cords suspending the sleeves at their free ends from the cover above the tanks.

2. A film developing table including an elongated, initially open top compartment including a bottom, front, rear and sides, a plurality of drawers projected into the compartment through the front, said drawers being in the form of open top tanks, a flexible but opaque cover for the table, means removably securing the cover taut on the table over the compartment whereby the latter is light-tight, and arm and hand entry means in the cover along the front edge thereof arranged to permit of manual access to the interior of the compartment while preventing the passage of light thereinto.

3. A film developing table, as in claim 2, in which the cover securing means includes dependent locator pins on the cover; the table having sockets at the corners of the compartment to receive said pins.

4. A film developing table including an elongated initially open-top compartment, a row of trays supported in the compartment, a flexible opaque cover over the top of the compartment, means securing the cover on the table so that it is taut and the compartment light-tight, hand-entry passages in the cover adjacent its front edge, and a transverse flap on the cover at one end overlapping the corresponding end of the compartment; the cover securing means being arranged to leave the cover disconnected from the table between the adjacent transverse corners of the compartment whereby to leave a normally light-tight film-transfer passage between the top of the compartment and the cover.

BEATRICE BONITA WEAVER.

References Cited in the file of this patent

UNITED STATES PATENTS

| Number | Name | Date |
|---|---|---|
| 722,052 | Sloan | Mar. 3, 1903 |
| 728,538 | Brown | May 19, 1903 |
| 801,418 | Kepler | Jan. 23, 1906 |
| 1,074,373 | Masko | Sept. 30, 1913 |